(12) United States Patent
Skinner

(10) Patent No.: US 9,801,335 B2
(45) Date of Patent: Oct. 31, 2017

(54) TRIMMER HEAD AND METHOD OF INSTALLING PIVOT POSTS THEREIN

(71) Applicant: Shakespeare Company, LLC, Columbia, SC (US)

(72) Inventor: David B. Skinner, Columbia, SC (US)

(73) Assignee: Shakespeare Company, LLC, Boca Raton, FL (US)

( * ) Notice: Subject to any disclaimer, the term of this patent is extended or adjusted under 35 U.S.C. 154(b) by 235 days.

(21) Appl. No.: 14/663,629

(22) Filed: Mar. 20, 2015

(65) Prior Publication Data

US 2015/0264862 A1 Sep. 24, 2015

Related U.S. Application Data

(60) Provisional application No. 61/955,949, filed on Mar. 20, 2014.

(51) Int. Cl.
*A01D 34/416* (2006.01)

(52) U.S. Cl.
CPC ..... *A01D 34/4165* (2013.01); *Y10T 29/49826* (2015.01)

(58) Field of Classification Search
CPC ............ A01D 34/4165; A01D 34/4166; A01D 34/733; A01D 34/736; A01D 34/416; A01D 34/4168
USPC ..................................... 30/276, 347; 56/12.7
See application file for complete search history.

(56) References Cited

U.S. PATENT DOCUMENTS

| | | | | |
|---|---|---|---|---|
| 4,107,841 A | * | 8/1978 | Rebhun | A01D 34/736 30/276 |
| 4,835,950 A | * | 6/1989 | Cerreta | A01D 34/416 56/12.8 |
| 5,430,943 A | * | 7/1995 | Lee | A01D 34/4168 30/276 |
| 5,491,962 A | * | 2/1996 | Sutliff | A01D 34/736 56/12.7 |
| 5,791,054 A | * | 8/1998 | Bessinger | A01D 34/4166 30/276 |
| 7,603,782 B2 | * | 10/2009 | Jerez | A01D 34/416 30/276 |
| 7,743,511 B2 | * | 6/2010 | Jerez | A01D 34/416 30/276 |
| 8,863,395 B2 | * | 10/2014 | Alliss | A01D 34/4166 30/276 |
| D719,415 S | * | 12/2014 | Albertson | D8/8 |
| 8,973,274 B2 | * | 3/2015 | Proulx | A01D 34/4166 30/122 |
| 2014/0202009 A1 | * | 7/2014 | Proulx | A01D 34/4166 30/333 |

(Continued)

*Primary Examiner* — Laura M Lee
(74) *Attorney, Agent, or Firm* — Eversheds Sutherland (US) LLP

(57) ABSTRACT

Trimmer heads for use with a rotary powered trimming device for cutting vegetation and methods of assembling such trimmer heads are provided. A trimmer head has one or more pivoting line holders and includes a single unitary molded housing having at least one recessed cavity located on the upper surface which is shaped and sized to receive a pivoting line holder. The recessed cavity includes reinforcement members for securely retaining the pivoting line holder therein via insertion of a metal bearing ring which allows for free rotation of pivoting line holder about its central axis within recessed cavity.

4 Claims, 18 Drawing Sheets

(56) References Cited

U.S. PATENT DOCUMENTS

| | | | |
|---|---|---|---|
| 2015/0107118 A1* | 4/2015 | Banjo | A01D 34/4168 30/276 |
| 2015/0201557 A1* | 7/2015 | Jerez | A01D 34/4166 30/276 |
| 2015/0216122 A1* | 8/2015 | Jerez | A01D 34/4165 30/276 |
| 2015/0289446 A1* | 10/2015 | Duvall | A01D 34/4166 30/276 |
| 2015/0366131 A1* | 12/2015 | Skinner | A01D 34/4166 30/276 |
| 2016/0227705 A1* | 8/2016 | Nolin | A01D 34/4166 |
| 2016/0295798 A1* | 10/2016 | Ferguson | A01D 34/4166 |

\* cited by examiner

STEP 1

STEP 2

STEP 3

TRIMMER HEAD AND METHOD OF INSTALLING PIVOT POSTS THEREIN

CROSS-REFERENCE TO RELATED APPLICATIONS

This application claims priority to U.S. Provisional Patent Application No. 61/955,949 filed Mar. 20, 2014, which is incorporated by reference as if fully rewritten herein.

FIELD OF INVENTION

The subject of this invention relates to trimmer heads for rotary trimmers using monofilament as a means for cutting vegetation; and, more specifically it relates to an improved method of assembling trimming heads where the trimmer heads include a means to hold folded strips of trimmer line. These means are capable of pivoting to minimize line breakage upon impact of the line with solid objects and dense vegetation.

BACKGROUND OF THE INVENTION

There are many names commonly used interchangeably for the monofilament line used for cutting vegetation, not limited to the following: trimmer line, weed trimmer line, grass trimmer line, monofilament line, string trimmer line, strimmer line, cutting line, line, line strips, strips, flails, and weed whacker line. Monofilament line is sold in many different cross-sectional shapes and is made from many different types of nylon plastic.

The prior art, including U.S. Pat. Nos. 7,603,782 and 7,743,511 (hereby included by reference for their teachings), discloses trimmer heads with line holding mechanisms (line holders) capable of pivoting on a vertical axis. There are many names commonly used for these line holders including, but not limited to posts, pivoting line holders, pivoting posts, pivot posts, line holding mechanisms and pivoting line holding mechanisms. All of these terms may be used interchangeably. These terms are used with line holders that are all designed to pivot about a vertical axis. However, some of these terms are also used with line holders that are not designed to pivot.

The prior art discloses a pivot post having a flange at the bottom of the post. This post is operatively connected to the trimmer head housing by loosely sandwiching the post's flange between a lower head portion (cover) and an upper housing portion of the trimmer head. The post is held such that its relative position on the head is fixed, the pivot post can rotate 360 degrees about a central vertical axis, but it cannot move vertically.

Certain commercialized products incorporating pivoting posts include line-holding mechanisms having the basic shape of a round post with a circular flange at the lower end. The top end of the post is beveled (slanted) on two opposite sides with two straight-through passageways for insertion of the trimmer line, where the passageways connect the two beveled portions. A representation of these prior art commercially available posts can be found as reference numeral 50 of the '511 patent.

Some of the commercially available trimmer heads utilizing the construction method of sandwiching the pivot post flange between lower and upper head portions include the PivoTrim™ X2, PivoTrim™ Ugly™ Head, and the PivoTrim™ Classic, PivoTrim™ Pro, and the PivoTrim™ Hybrid. These products are sold by Shakespeare Company, LLC.

The prior art also discloses pivoting line holders which mount to the top surface of the trimmer head and are assembled to the trimmer head housing using threaded fasteners such as bolts. These line holders pivot about the axis of the fastener. The trimmer line is completely held at the periphery of the holder and the center of gravity of the holder is not aligned with the axis of rotation.

The prior art further discloses a trimmer head which builds upon this latter type of pivot post design and is disclosed in U.S. Publication 2014/0202009, hereby disclosed by reference. This trimmer head requires custom manufactured fasteners which are intended to be periodically removed and reinstalled by the consumer to allow the use of blades instead of line holders.

SUMMARY OF THE INVENTION

The current proposed invention is a trimmer head and method of assembly utilizing pivoting line holders of the type where the center of gravity (CG) of the post is vertically aligned with its vertical axis of rotation. The trimmer heads in this specification require fewer steps for assembly than prior art trimmer heads. These simplified head designs are of value because fewer components need to be manufactured per head, fewer steps are required for assembly of the head, and large custom machined fasteners are not required. Therefore, the invention is also of value because it is inexpensive to produce.

One objective of this invention is to provide a trimmer head that is inexpensive to manufacture that utilizes pivoting line holders, where the center of gravity of the line holders is aligned with the posts vertical axis of rotation.

Another objective is to provide a simple method for assembling a trimmer head designed to utilize pivoting line holders which hold folded strips of line.

Another objective is to provide a trimmer head which is light weight and suitable for use with lighter duty trimmers.

Another objective is to provide a trimmer head design where a bearing ring, sized to hold a pivoting post in operative position, can be precisely positioned and tightly held, and yet allow unobstructed rotation of the line holder.

Another objective is to provide a trimmer head that holds a folded strip of trimmer line using a line holder that can freely pivot.

Another objective is to provide designs for trimmer heads mounted with pivoting line holders based upon a housing that can be molded as one piece.

Another objective is to provide a simplified method of assembly for the invention.

DETAILED DESCRIPTION OF THE INVENTION

Figure 1:
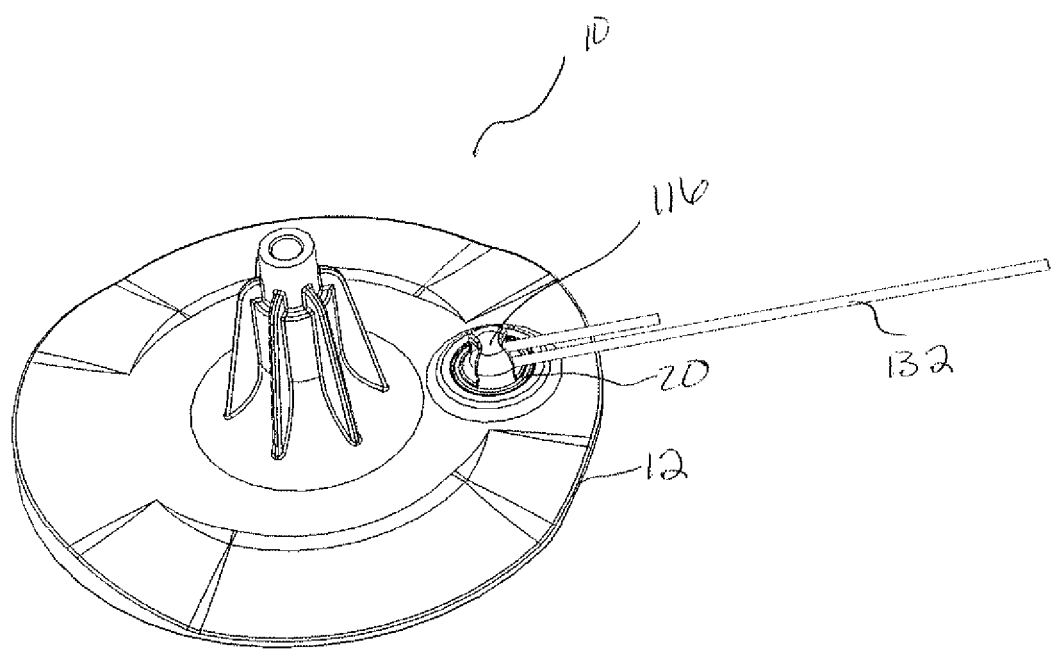
FIG. 1 shows perspective view of a trimmer head assembled pursuant to the method of the present invention.
Figure 6:
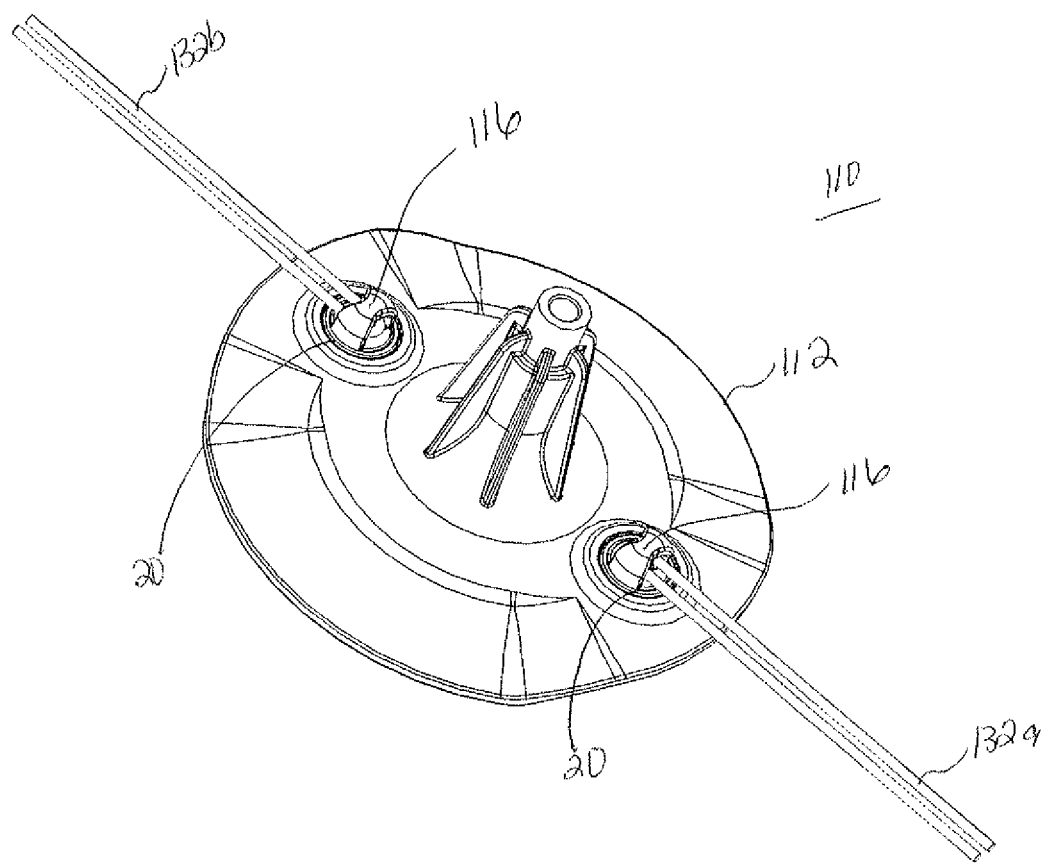
FIG. 6 shows an upper perspective view of a second embodiment, assembled pursuant to the method of the present invention.
Figure 17:
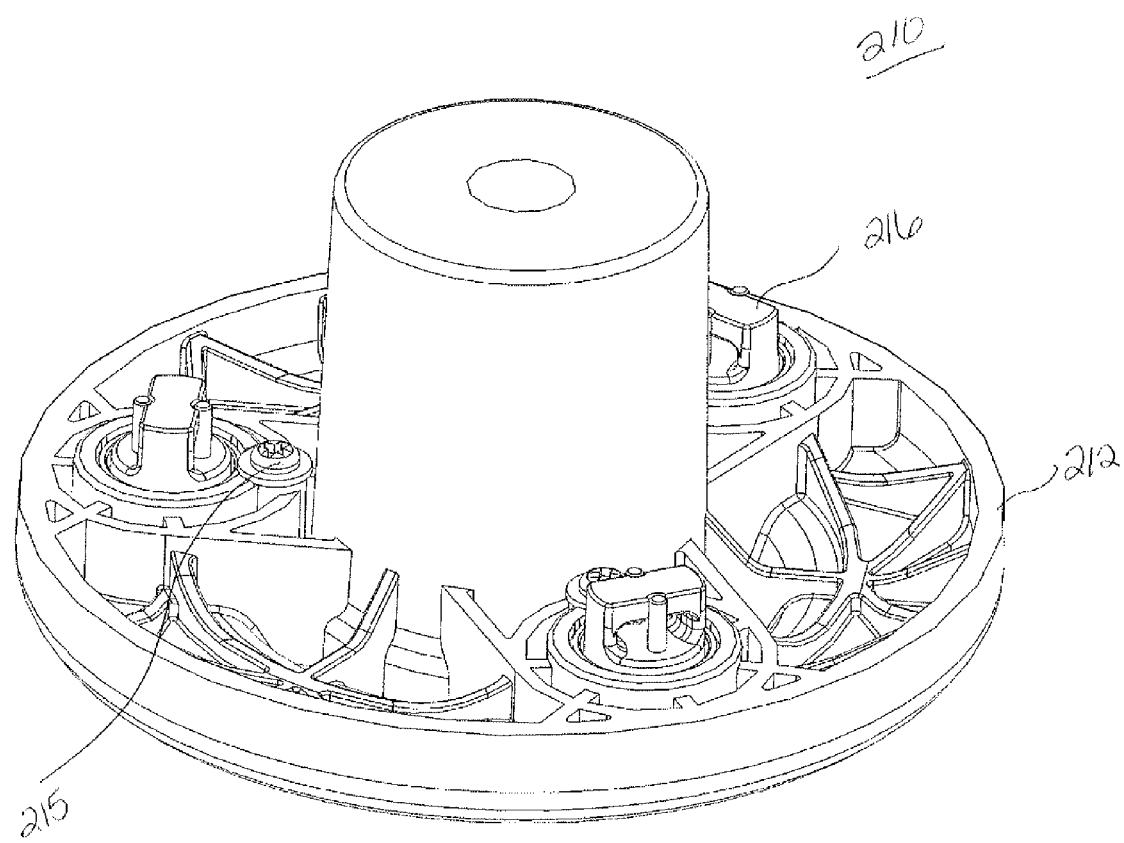
FIG. 17 shows a third embodiment of a trimmer head assembled pursuant to the method of the present invention.

FIGS. 1, 6 and 17 show three embodiments of trimmer heads assembled pursuant to the method of the present invention. The trimmer head in FIG. 1 is a perspective view of the first embodiment of assembled trimmer head 10, shown with a single pivot post 116. FIG. 6 is a perspective view of the second embodiment of the assembled trimmer head 110, shown with two pivot posts 116. The pivot posts 116 in both embodiments are of the same design. Variations of the trimmer head which have three or more equally spaced pivot posts are also within the scope of this invention. FIG. 17 shows a trimmer head assembled with three pivot posts using the assembly method of this invention.

A unique feature of the two trimmer heads 10 and 110 is that the housing 12 can be molded as a single piece. Compared to prior art trimmer head housings constructed of two pieces—having both upper and lower head portions—the design of trimmer heads 10 and 110 eliminates one of the molded pieces, eliminates the need for screws to join the two head portions, eliminates some of the assembly costs associated with two-piece housing constructions, and minimizes the trimmer head weight. All of these refinements reduce the cost of a trimmer head manufactured with pivoting line holders pursuant to the presently disclosed assembly method.

Figure 2:
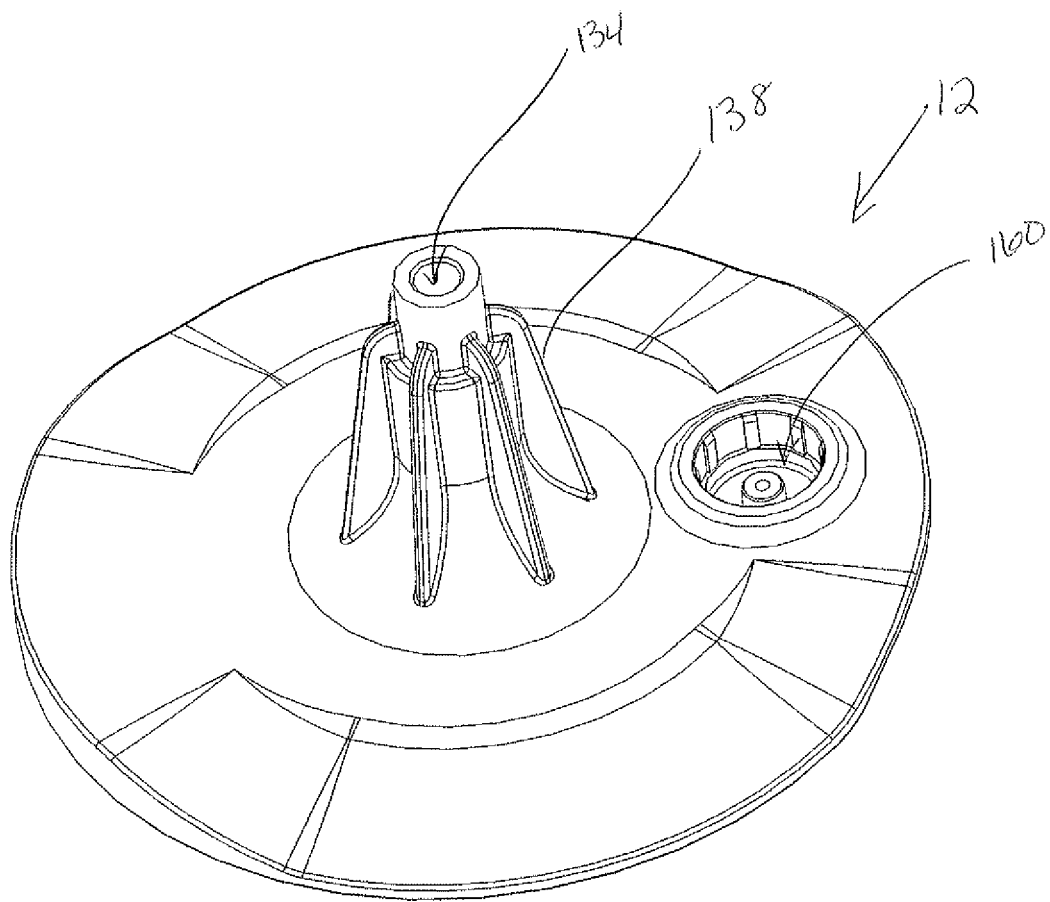
FIG. 2 shows an upper perspective view of the main housing of the trimmer head shown in FIG. 1.
Figure 3:
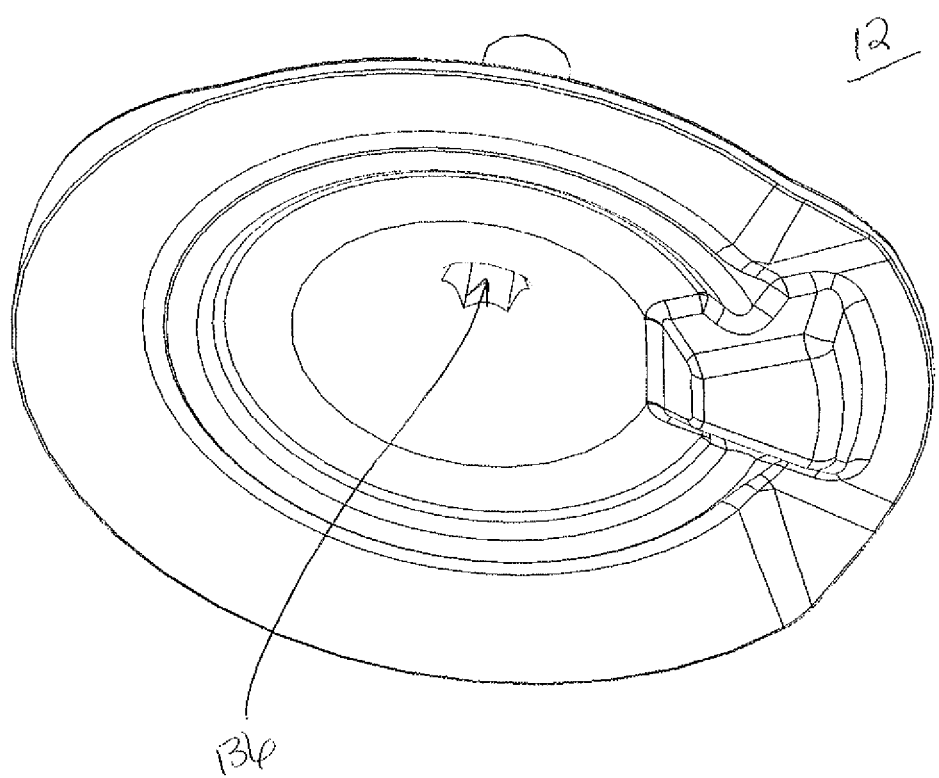
FIG. 3 shows a lower perspective view of the main housing of the trimmer head shown in FIG. 1
Figure 4:
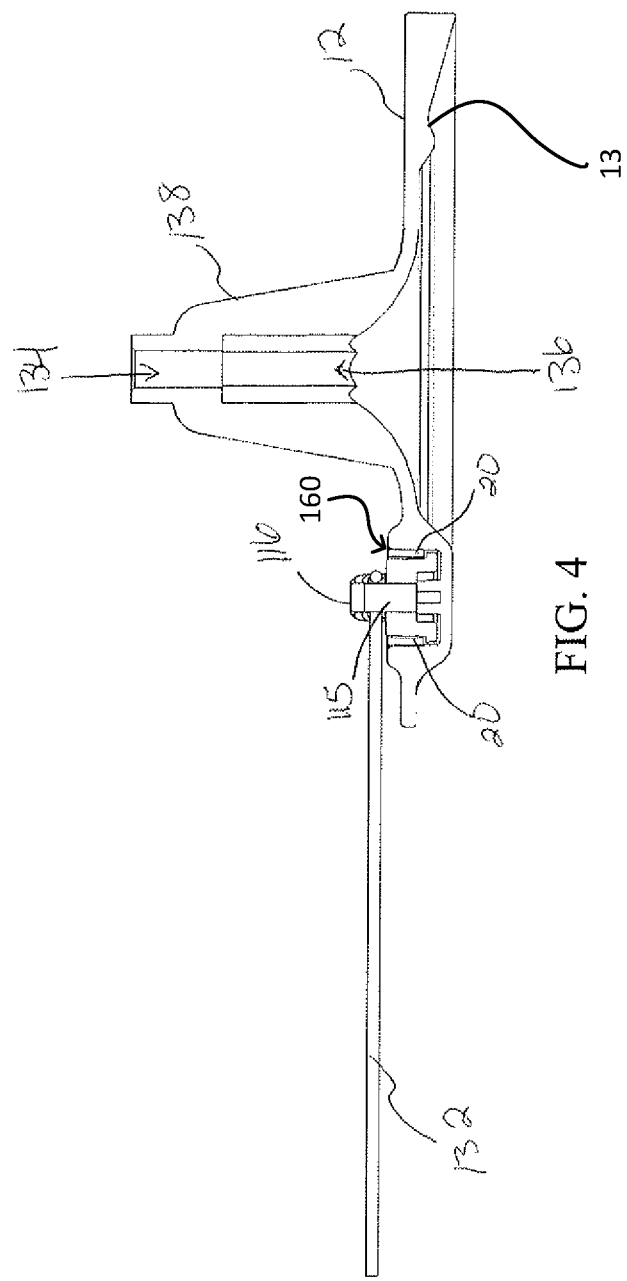
FIG. 4 shows a cutaway of a side view of the main housing of the trimmer head shown in FIG. 1, taken through the pivot post.
Figure 5:
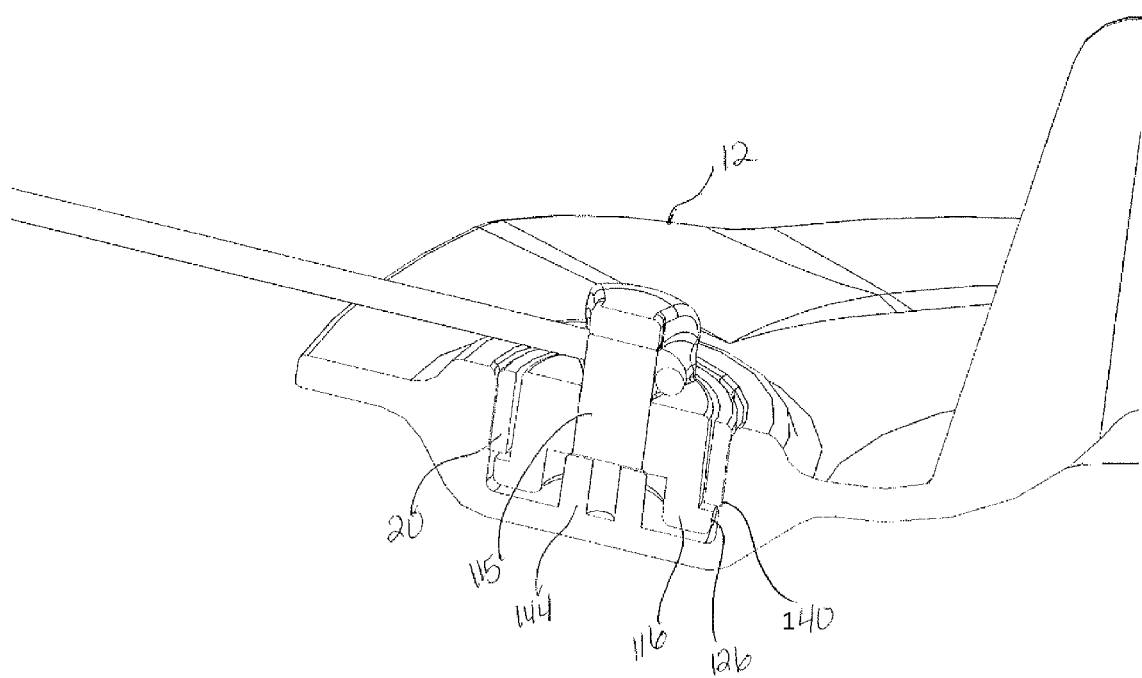
FIG. 5 shows a cutaway perspective view of a portion of the trimmer head shown in FIG. 1.

FIGS. 2 and 3 show two alternative views of housing 12 which may be used by trimmer head 10. The housing as shown in FIG. 2 has a central opening 134 for receiving a threaded stem (not shown) from a string trimmer machine. A fastener (not shown) with a hexagon head is inserted into the hexagonal-shaped cavity 136 (see FIG. 3). The housing 12 is rotated until the fastener fully tightens onto the threads of the trimmer stem and against the inside of the housing. The first embodiment is designed to hold one pivot post 116 in the recessed opening 160. The housing is designed so that extra mass (see FIG. 4) is molded into the housing opposite the recessed opening 160, for example at region 13. This extra mass is added to balance the head so that it can be spun at high speeds (typically 8,000 to 10,000 rpms) without vibration.

The housing 12 has a series of ribs 138 which strengthen and stabilize the vertical and horizontal portions of the housing. These ribs are shown positioned on the upper side of the housing. However, the housing could also be designed to be smooth on the upper side with the strengthening ribs positioned on the underside of the housing.

The line holding mechanisms 116 (also called pivot posts) are held in recessed cavities 160 by a metal ring 20. The metal ring is press-fit into the cavity 160. This metal ring 20 functions as a bearing sleeve and provides a wear resistant surface. The pivot post design 116 is merely representative of one of many types of pivot posts that could be used with the invention. There are numerous pivot post designs that could be installed into the housing of the first embodiment 10 and the second embodiment 110 including those pivot post designs commercially available so long as the bottom portion of the post was modified to allow installation into the recessed cavity of the present invention.

Figure 16:
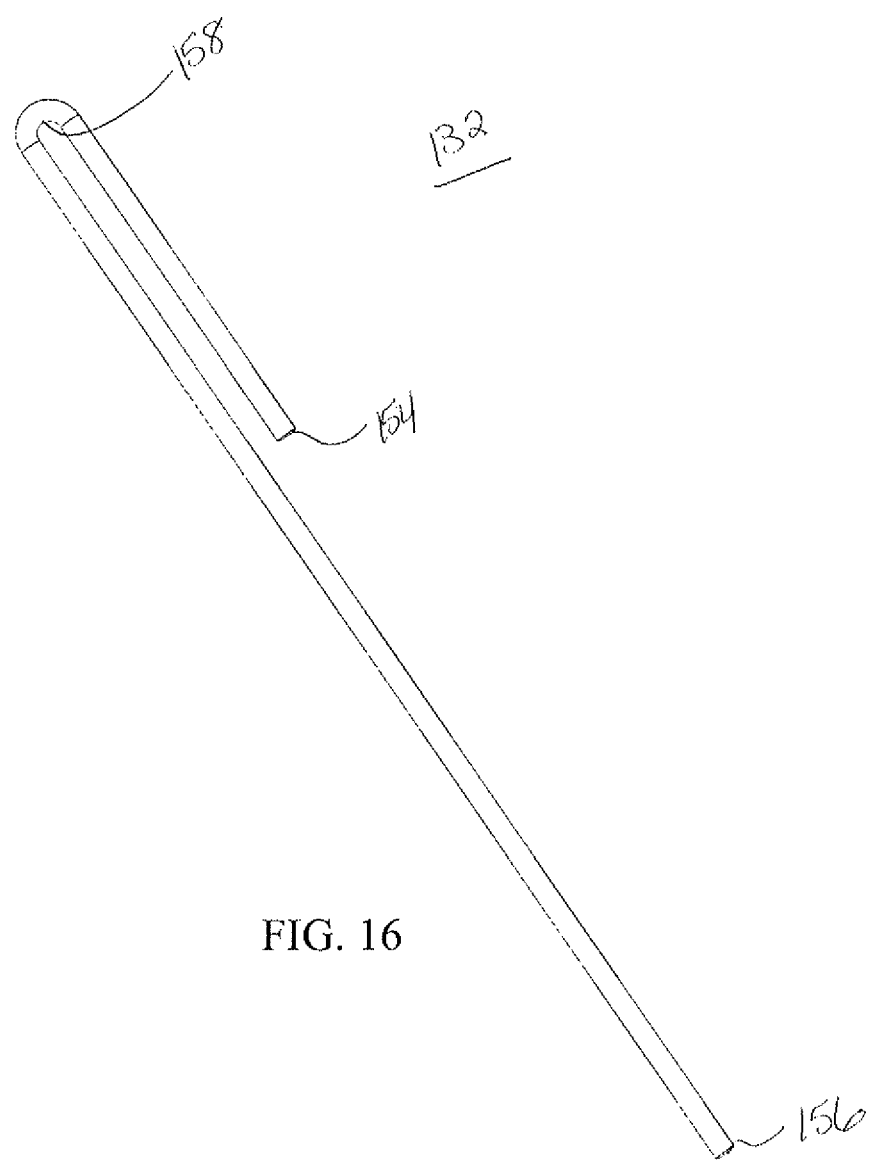
FIG. 16 shows a folded strip of trimmer line.

The pivot posts 116 are designed to hold a folded strip of trimmer line 132 as shown in FIGS. 1 and 6. A representation of the trimmer line 132 is shown in FIG. 16. The strip of trimmer line has two distal ends (154 and 156) and is folded at a point between the two distal ends. In FIGS. 1 and 16, one end 156 of the trimmer line is allowed to extend further than the second end 154. In FIG. 6, both legs of the folded strip of trimmer line are the same length and the pair of distal ends are positioned adjacent to each other.

Figure 9:
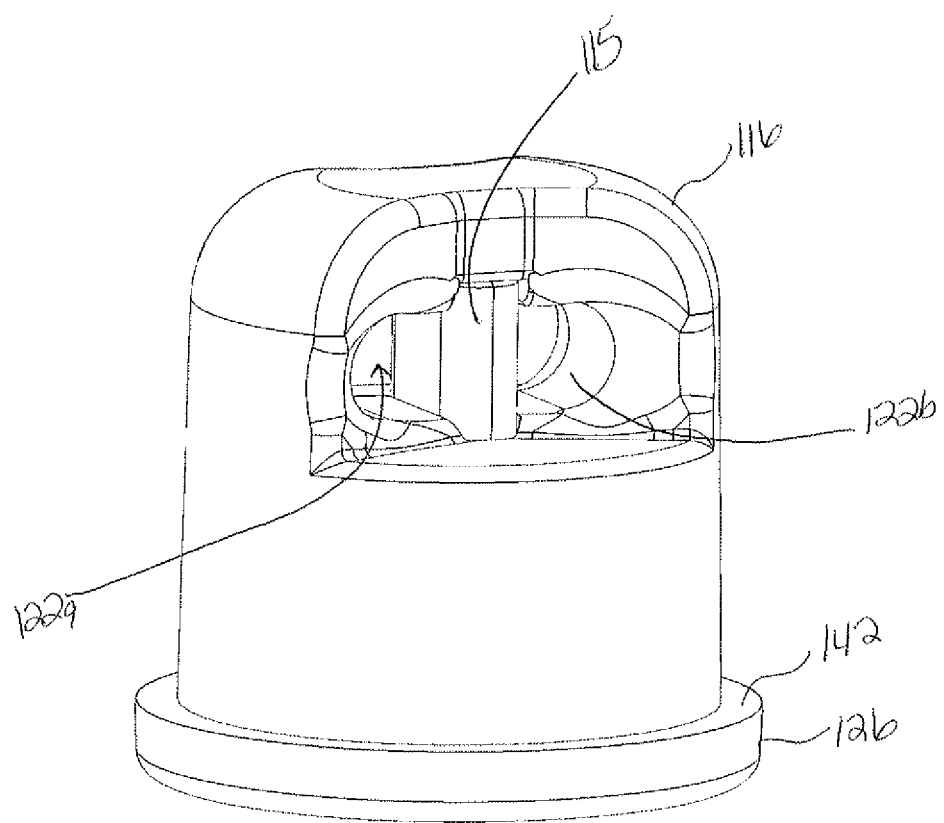
FIG. 9 shows a side perspective view of a pivot post assembly for use with the trimmer heads shown in FIG. 1 and FIG. 6.
Figure 10:
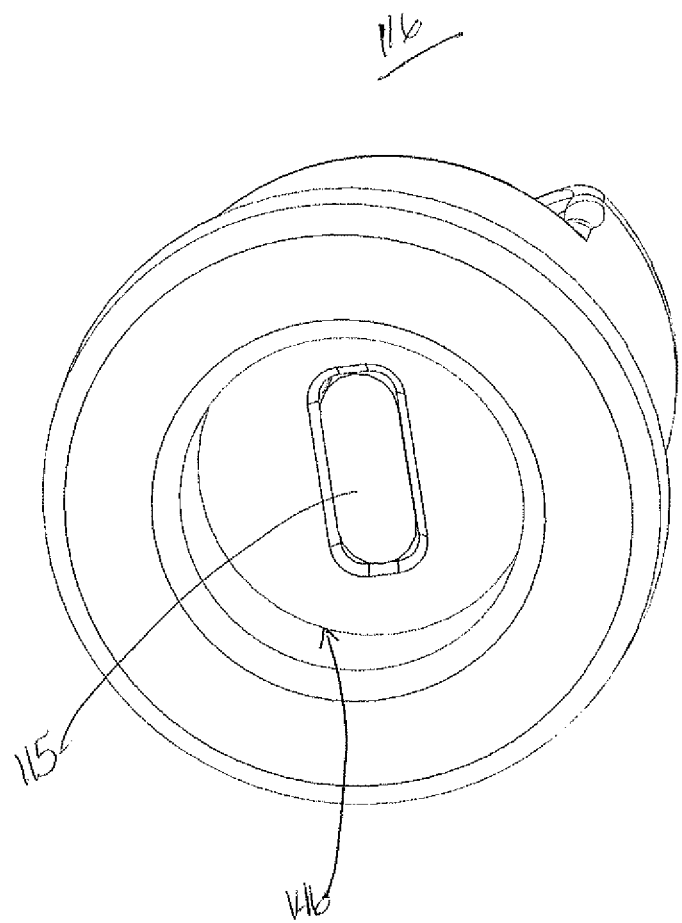
FIG. 10 shows a lower perspective view of the pivot post shown in FIG. 9.
Figure 11:
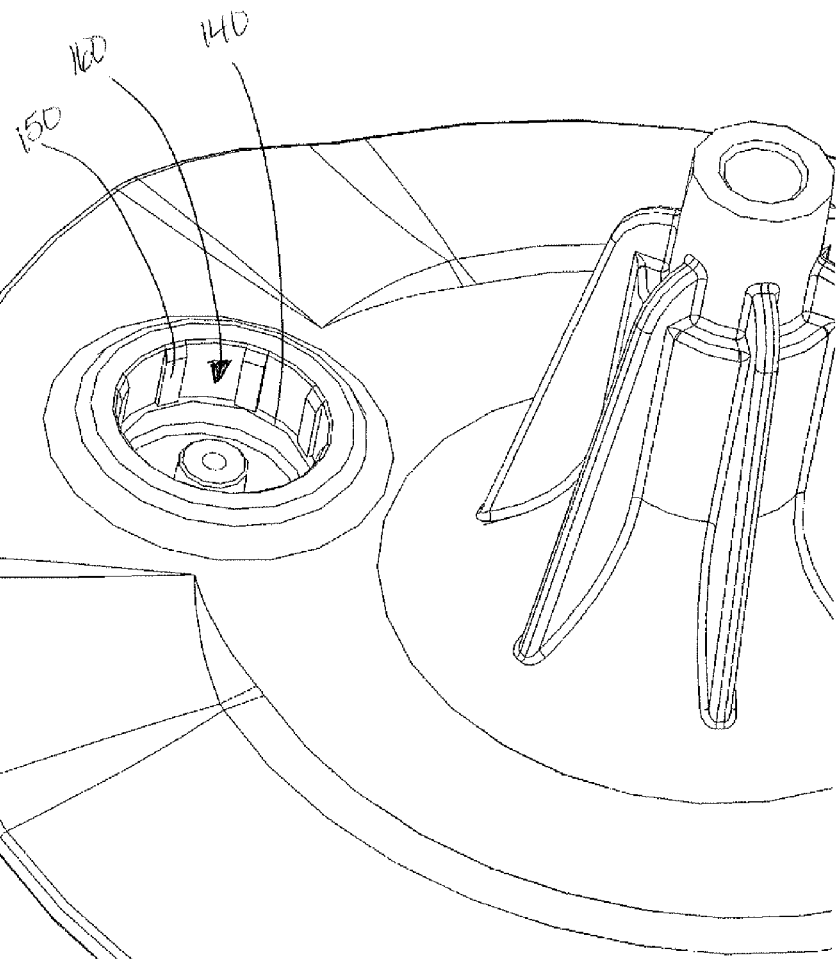
FIG. 11 shows an upper perspective view of a portion of the main housing and demonstrates a first step of the assembly process of the present invention.
Figure 12:
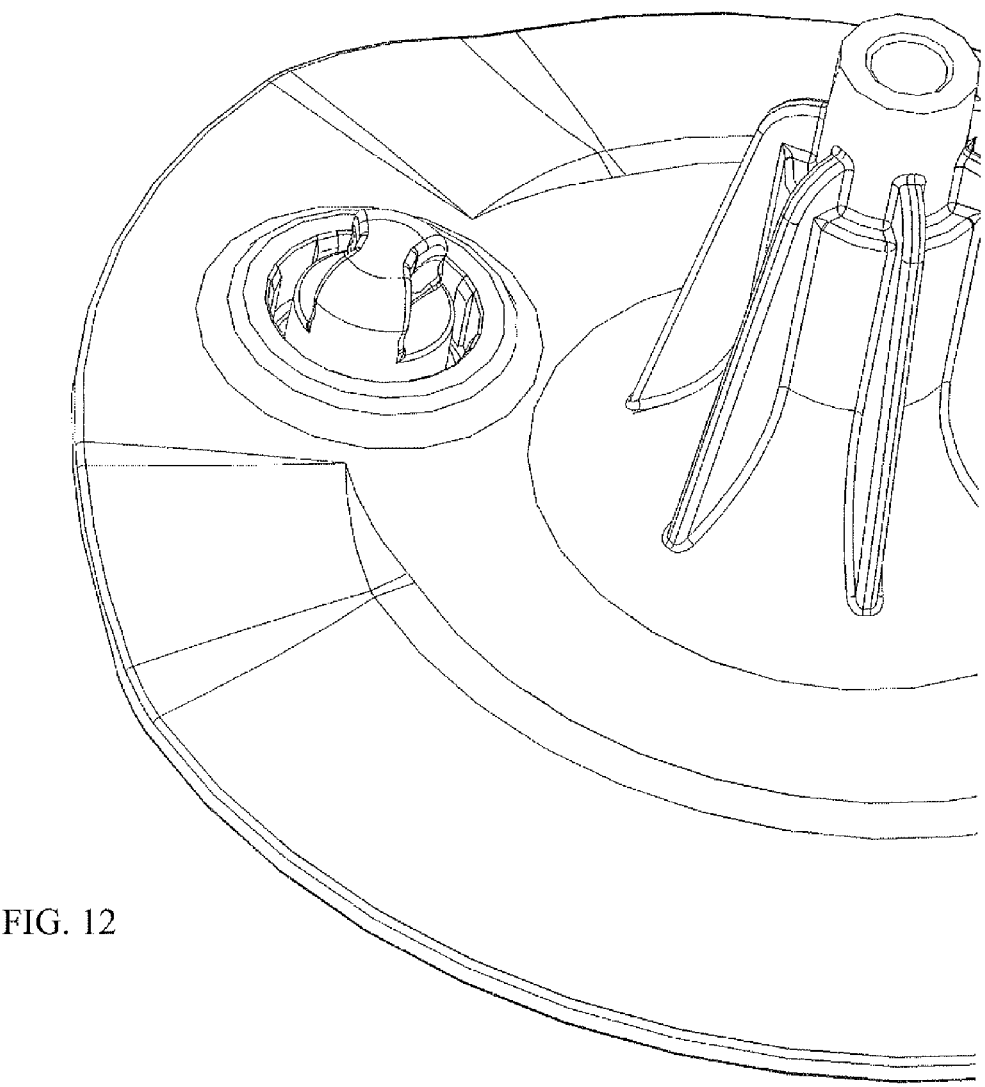
FIG. 12 shows the main housing of FIG. 11 and demonstrates the successive step of installing the pivot post.
Figure 13:
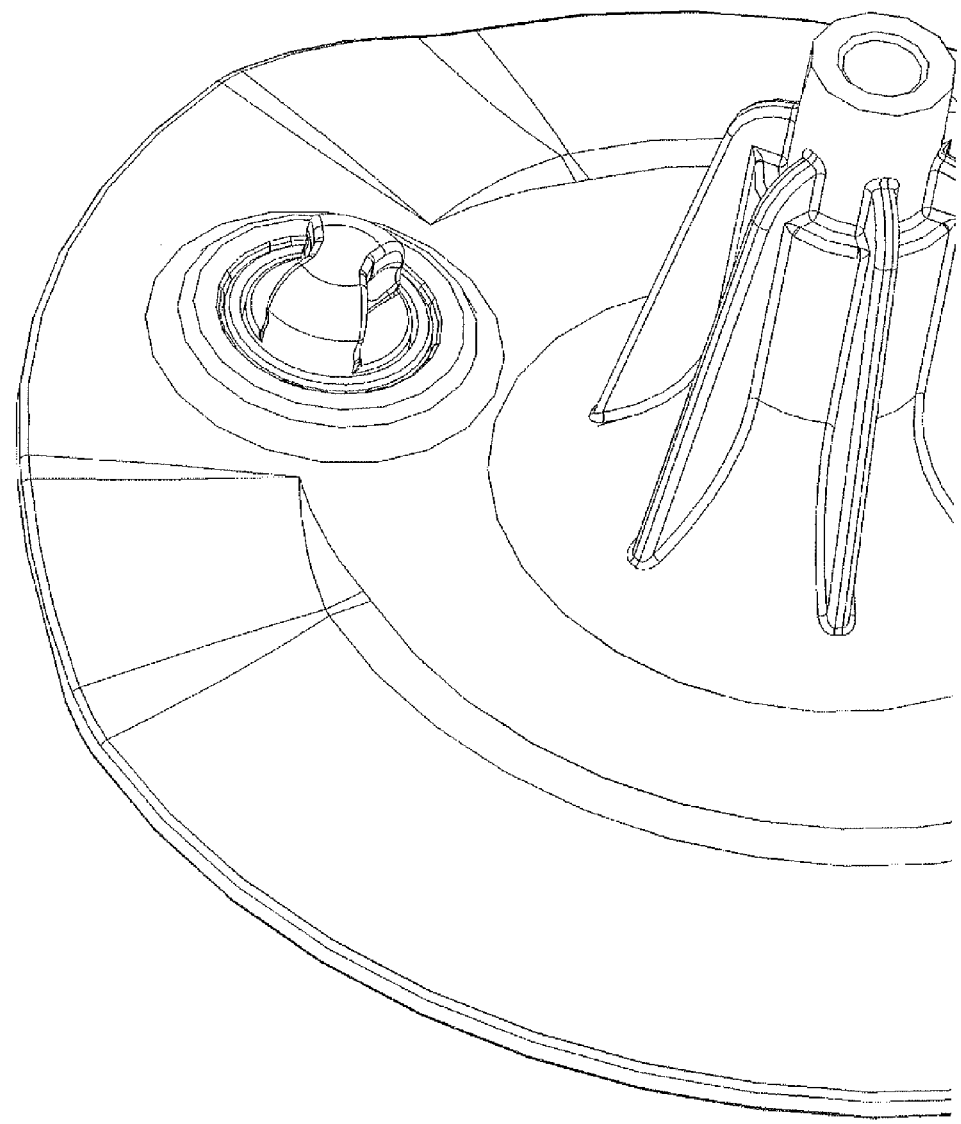
FIG. 13 shows the main housing of FIG. 12 and demonstrates the final step of installing the metal ring.
Figure 14:
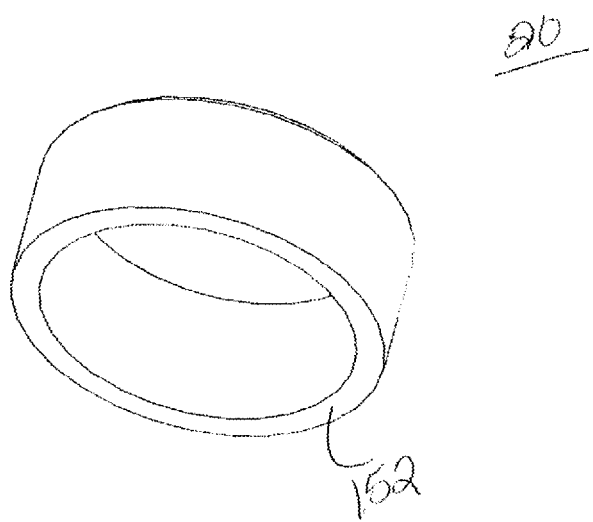
FIG. 14 shows the metal ring of FIG. 13 (also known as the bearing sleeve).
Figure 15:
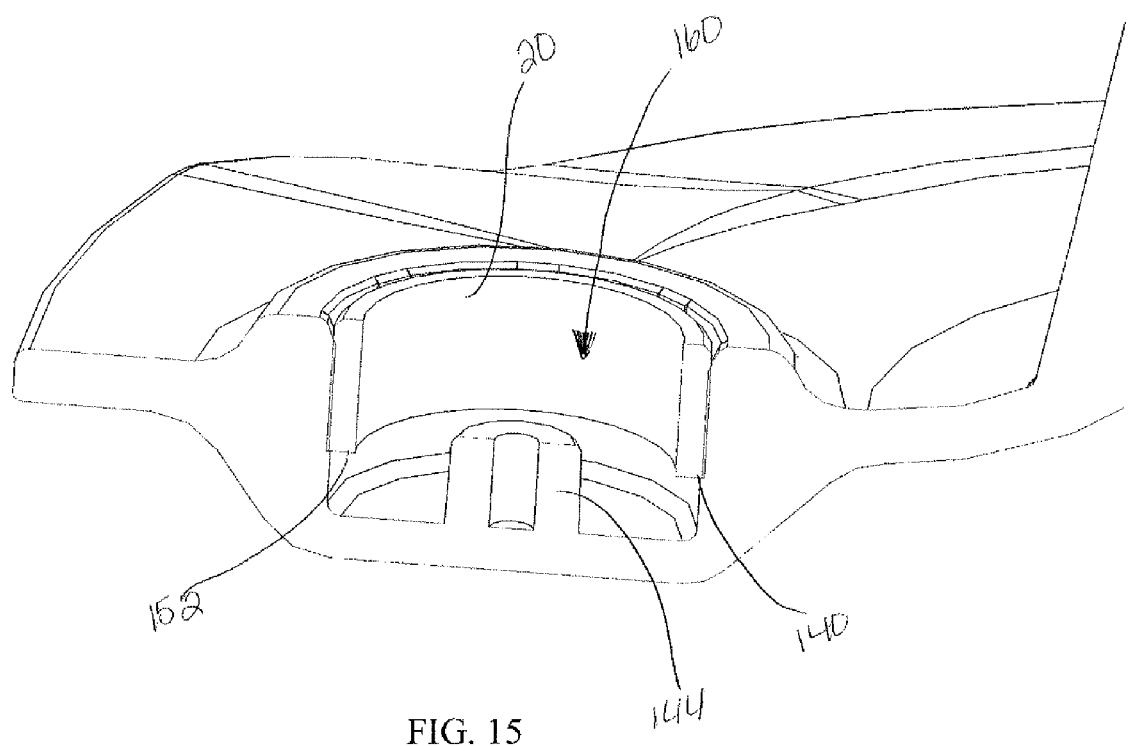
FIG. 15 shows a cutaway of the receptacle for receiving a pivot post and bearing sleeve, with the bearing sleeve fully inserted.

When installing the strip of trimmer line 132 into the pivot post 116, the two distal ends are threaded through the two openings 122a and 122b (see FIG. 9), and then the ends are pulled until the inside radius 158 of the folded line 132 is pulled tight against the metal insert 115. The line is shown installed in the head in FIGS. 1, 4, 5, 6 and 7.

Figure 8:
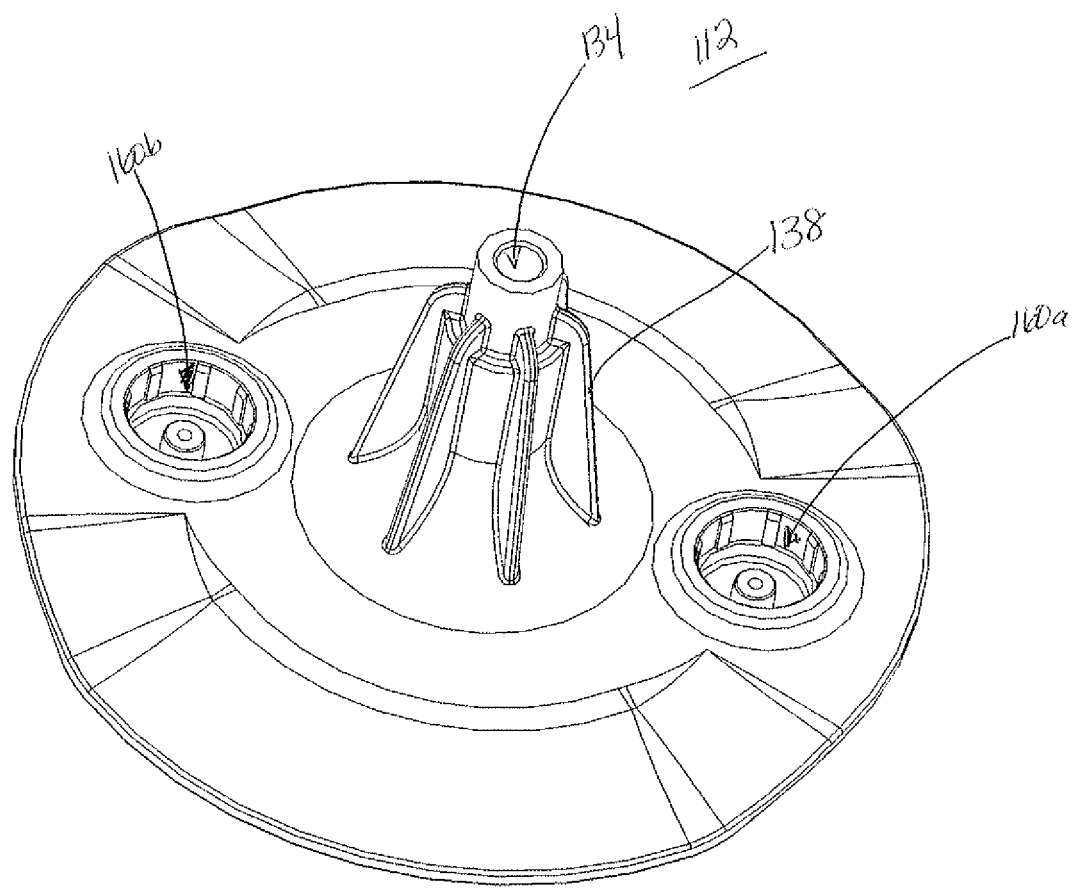
FIG. 8 shows an upper perspective view of the main housing of the trimmer head shown in FIG. 6.

The housing 112 for the head shown in FIG. 6 does not require any extra mass for counterbalance. The housing 112 for this second embodiment has two recessed cavities 160a and 160b (see FIG. 8), each for receiving a pivot post 116. Ignoring the orientation of the pivot posts, the head 110 is symmetrical about a vertical plane passing through the vertical central axis of rotation of the two pivot posts, and symmetrical about a vertical plane perpendicular to the first plane which also passing through the midpoint between the two posts.

Figure 7:
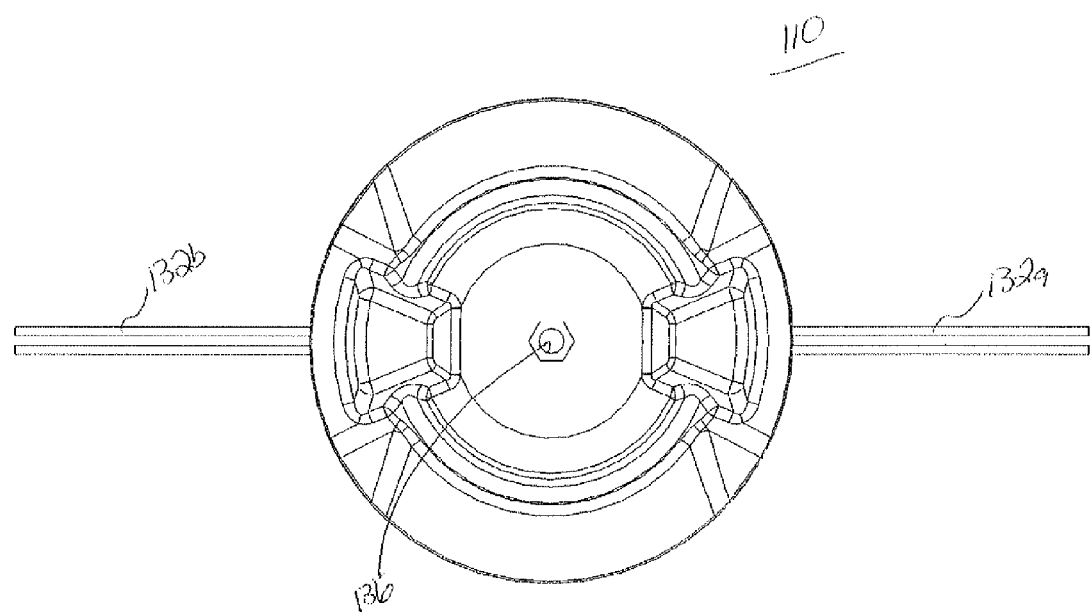
FIG. 7 shows a bottom view of the trimmer head shown in FIG. 6.

FIG. 7 shows a bottom perspective for the second embodiment trimmer head 110. The hexagon cavity 136 is the same for both trimmer heads 10 and 110; however, they could be designed differently. For example, they could be designed to work with a larger nut or bolt size. There are also other methods for attaching a trimmer head to a string trimmer machine which are commercially practiced. These alternative methods could likewise be used. Additionally, the housing could also have a perimeter shape other than round. The perimeter could be oval, square or rectangular with rounded corners, three-legged like the Ugly™ Head, or any of a variety of head shapes. It is also possible to have two or more pivot posts that are not equally spaced so long as mass is added to balance the head to prevent vibration during rotation.

The next discussion will reference FIGS. 5, 9, 10, 11, 12, 13, 14 and 15. The cavity 160 is designed with a series of radial ribs 150. At the base of these ribs is a ridge molded into the lower portion of the cavity 160. This ring shaped ridge has an upper edge 140. The metal bearing ring 20 has an outer edge 152. The opening between the ribs 150 is sized such that the metal ring 20 is held firmly between the ribs 150. Additionally, the lower edge 152 of the metal bearing ring 20 will come to rest against the upper edge 140 of the molded ridge, which allows for precisely positioning the bearing ring 20 in the cavity 160. The outer diameter of the flange on the pivot post is smaller than the inside diameter of the recessed cavity 160, but larger than the inside diameter of the metal bearing ring 20. Additionally, the height of the flange on the pivot post is less than the height of the ring molded into the bottom of the recessed cavity 160. This allows the pivot post to freely spin inside of the metal bearing ring, and yet it cannot come out of the recessed cavity 160.

Prior to inserting the bearing ring 20 into cavity 160, the pivot post (or pivot post assembly) must first be placed in the cavity 160. The cavity can optionally contain a post 144 (see FIG. 5) upon which the line holder 116 can spin. In this case, the pivot post 116 must have a recessed opening 146 (see FIG. 10) to allow for the free spinning of the pivot post 116 on the post 144. The pivot post 116 has a flange 126 such that part of the upper edge 142 of the flange is below part of the lower edge 152 of the bearing ring 20 when installed. Additionally, the combination of the cavity 160 with the ring 20 installed allows sufficient space so that the flange 126 of the pivot post 116 is loosely held such that the pivot post is allowed to spin freely about its central vertical axis.

The embodiments presented are also unique in that the assembly of the head is simplified. For the commercial trimmer heads currently offered by Shakespeare Company, LLC, the following six steps are required to assemble the trimmer heads: (1) position the upper portion of the head in an upside down orientation; (2) press a metal ring into each of the openings of the upper portion of the head; (3) place the molded pivot posts in the metal rings; (4) place the lower cover over the upper housing portion and align the passageways for the screws; (5) while holding the lower cover to the upper housing, re-position the entire unit by flipping these over; (6) install screws to connect the cover to the upper housing. The improved method of assembly and improved trimmer head requires only the following three steps for assembly: (1) position the head housing right side up (see FIG. 11); (2) place the pivot posts 116 into the cavities 160 (see FIG. 12), and (3) press the rings 20 into the cavities 160 (see FIG. 13).

The improved method disclosed above applies for a pivot post molded as a solid piece of plastic. In the above improved method as well as the currently available method of assembly, a press is typically used to install the bearing rings.

The novel and improved three-step assembly method allows for the following alternate method to assemble the head without the use of a press to push the bearing rings into position. The housings of trimmer heads are typically molded of nylon plastic. The nylons must be heated & melted prior to the molding step. The nylon will shrink slightly after molding and upon cooling. It is possible to place the pivot post into the recessed cavities 160 immediately after molding and then manually set the bearing rings 20 into position in the cavities 160. No mechanical press is required. As the nylon cools, the inside diameter of the recessed cavity 160 would become smaller, allowing the cavity to tighten around the bearing ring. This approach to setting the bearing rings combined with the above three step assembly method would eliminate the need for a secondary assembly operation and thus further reduce the cost of the trimmer head. The head could easily be assembled at the molding machine. This assembly process could be done using robotics at the molding machine.

A variation of the above concepts would include using recessed cavities 160 with smooth walls (no ribs 150), and placing ribs on the outer wall of the bearing ring. Additionally, it may be possible to eliminate the ribs 150 entirely if utilizing the shrinkage of the housing after molded to fix the bearing ring in the housing. However, the ribs facilitate installation of the bearing ring into the housing when a mechanical press is utilized, which would be required if the housing is already cooled and thus no shrinkage of the housing is expected after installing the bearing rings.

FIG. 17 shows an alternate trimmer head embodiment 210 assembled using the same novel methods discussed above. The pivot posts 216 are of a different design than the pivot posts 116. The common features are the flange and the round shape of the lower portion of the posts. Many different pivot post designs can be assembled using the novel method discussed above.

Figure 18:
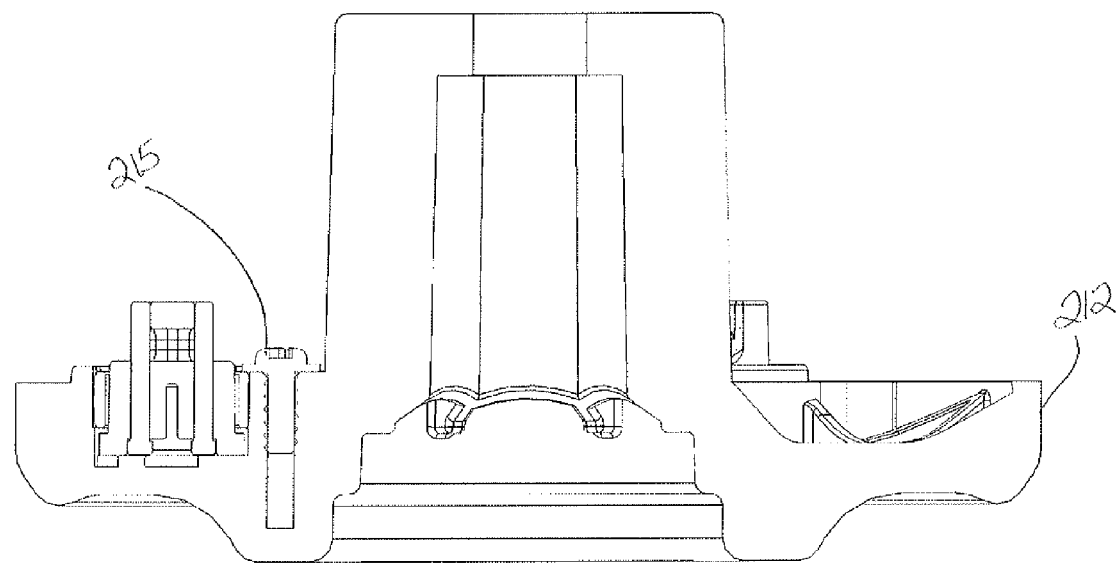
FIG. 18 is a cross-sectional view of the trimmer head shown in FIG. 17.

FIG. 18 shows a cross-sectional view of the pivot post 216 assembled in housing 212. The only additional component is a screw 215 mounted adjacent to the pivot post. The screws 215 are not used as part of the assembly method. Rather, these screws are provided as a safety device to ensure that the bearing ring does not pull out of the cavity in which it is mounted. The screw has a flange that overlaps the bearing ring.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined by the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e. meaning "including, but not limited to") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A trimmer head for use with a rotary powered trimming device for cutting vegetation, said trimmer head comprising:
   a housing molded as a single unitary piece having a first upper surface and a second opposed lower surface and having a central opening for operable connection to a powered trimming device;
   a series of reinforcing ribs molded into at least one of the first upper surface or the second lower surface of said housing;
   a single substantially cylindrical shaped recessed cavity located on said first upper surface, the cavity having interior walls comprising a series of molded vertically extending reinforcement members and the cavity having a bottom comprising a ring-shaped ridge extending around the interior perimeter thereof, said ridge having an upper edge;
   a single pivoting line holder capable of holding a folded strip of trimming line, the line holder having a substantially cylindrical housing and a lower flange radially extending from the lower periphery of said line holder housing, said line holder housing and lower flange shaped and sized to fit within said recessed cavity, said lower flange height being less than the height of said ring-shaped ridge;
   a metal bearing ring having an upper edge and a lower edge, said bearing ring fitting firmly between said recessed cavity reinforcement members, the lower edge of said bearing ring supported by said cavity ridge, an inner diameter of said bearing ring being smaller than an outer diameter of said pivoting line holder lower flange;
   said pivoting line holder having a central vertical axis about which said pivoting line holder spins freely within the recessed cavity; and
   a weighted mass molded into said housing opposite said recessed cavity.

2. A trimmer head for use with a rotary powered trimming device for cutting vegetation, said trimmer head comprising:
   a housing molded as a single unitary piece having a first upper surface and a second opposed lower surface and having a central opening for operable connection to a powered trimming device;
   a series of reinforcing ribs molded into at least one of the first upper surface or the second lower surface of said housing;
   at least two substantially cylindrical shaped recessed cavities equally peripherally spaced apart on said first upper surface, each cavity having interior walls comprising a series of molded vertically extending reinforcement members and each cavity having a bottom comprising a ring-shaped ridge extending around the interior perimeter thereof, said ridge having an upper edge;
   a number of pivoting line holders equal to the number of recessed cavities, each pivoting line holder capable of holding a folded strip of trimming line and each line holder having a substantially cylindrical housing and a lower flange radially extending from the lower periphery of the line holder housing, said line holder housing and lower flange shaped and sized to fit within a respective recessed cavity, said lower flange height being less than the height of said ring-shaped ridge;
   a number of metal bearing rings equal in number to the number of pivoting line holders, each bearing ring having an upper edge and a lower edge, each bearing ring fitting firmly between said reinforcement members of one of said at least two recessed cavities, the lower edge of each bearing ring supported by a ridge of said at least two recessed cavities, an inner diameter of each bearing ring being smaller than an outer diameter of said respective pivoting line holder lower flange;
   wherein each of said pivoting line holders has a central vertical axis about which said pivoting line holder spins freely within the recessed cavity.

3. A method of assembling a trimmer head comprising the steps of:
   positioning a single unitary molded trimmer head housing having a first upper surface and a second opposed lower surface, said first upper surface having at least one substantially cylindrical recessed cavity having interior walls comprising a series of molded vertically extending reinforcement members and a bottom comprising a ring-shaped ridge extending around the interior perimeter thereof wherein said ring-shaped ridge has an upper edge so that the at least one recessed cavity is oriented on the top of the housing;
   inserting a single pivoting line holder mechanism capable of holding a strip of folded trimming line into each one of said at least one recessed cavity by positioning a lower flange of each pivoting line holder mechanism into one of said at least one recessed cavity and within each ring-shaped ridge of said one of said at least one cavity so that each lower flange is flush with the bottom of said one of said at least one cavity; and
   press fitting a single metal bearing ring into each one of said at least one recessed cavity, around each of said pivoting line holders until a lower edge of said bearing ring abuts and is supported by the upper edge of said ring-shaped ridge to secure said bearing ring within said cavity.

4. A method of assembling a trimmer head comprising the steps of:
   heating and melting nylon material to mold a single unitary housing, said housing having a first upper surface and a second opposed lower surface, said first upper surface having at least one substantially cylindrical recessed cavity having interior walls comprising a series of molded vertically extending reinforcement members and a bottom comprising a ring-shaped ridge extending around the interior perimeter thereof wherein said ring-shaped ridge has an upper edge;
   positioning said housing so that the at least one recessed cavity is oriented on the top of the housing;
   inserting a single pivoting line holder mechanism capable of holding a strip of folded trimming line into each one of said at least one recessed cavity by positioning a lower flange of said pivoting line holder mechanism into said one of said at least one recessed cavity and within said ring-shaped ridge so that the lower flange is flush with the bottom of said cavity immediately after molding said housing;

placing a metal bearing ring into position within each one of said at least one cavity around each of said pivoting line holders until a lower edge of said bearing ring abuts and is supported by the upper edge of said ring-shaped ridge of said one of said at least one cavities; and allowing for reduction of an inside diameter of each one of said at least one recessed cavity upon cooling of the molded nylon to secure each bearing ring within each respective one of said at least one recessed cavity.

\* \* \* \* \*